United States Patent Office 2,903,995
Patented Sept. 15, 1959

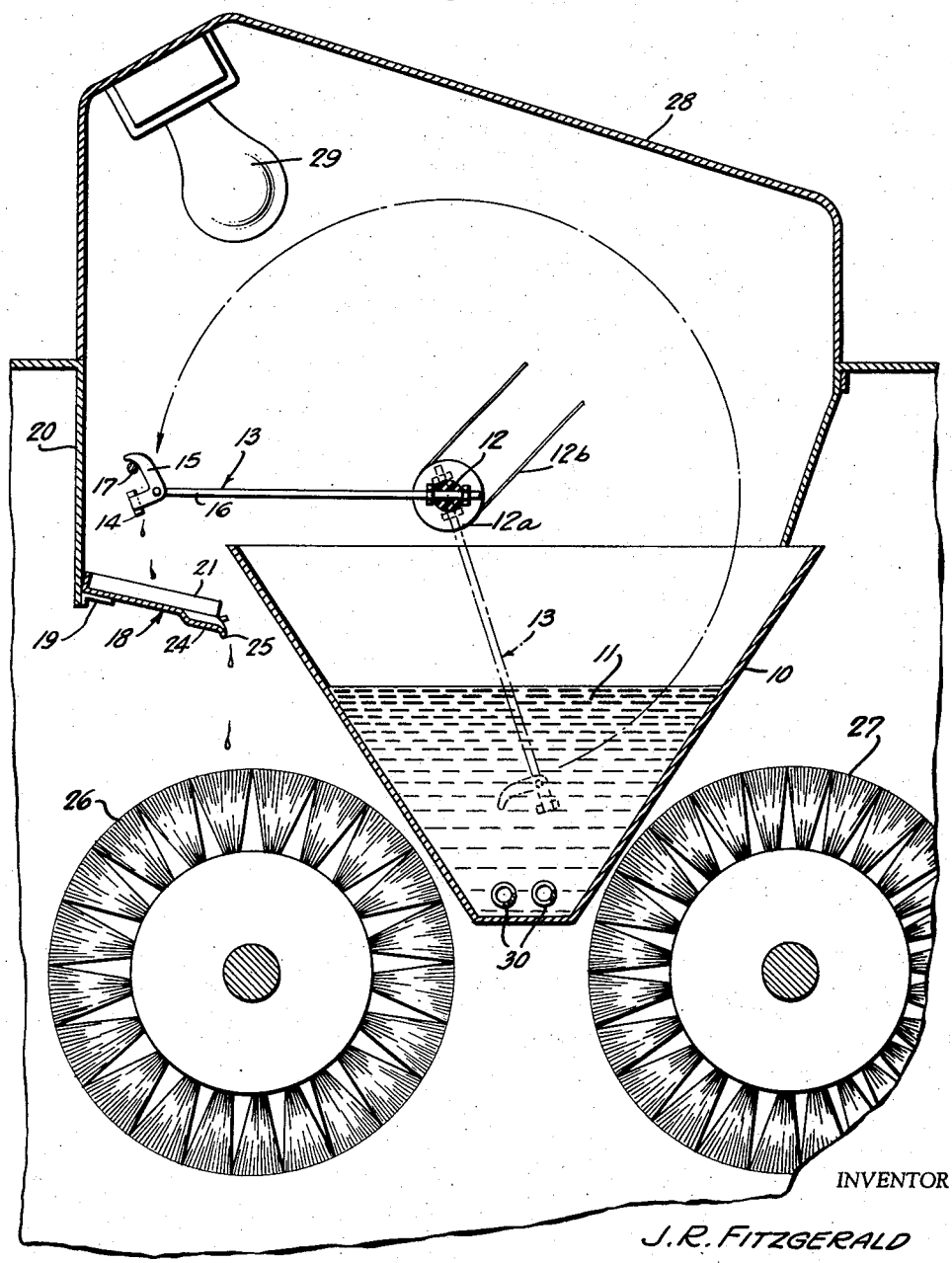

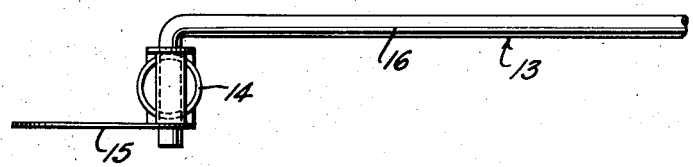
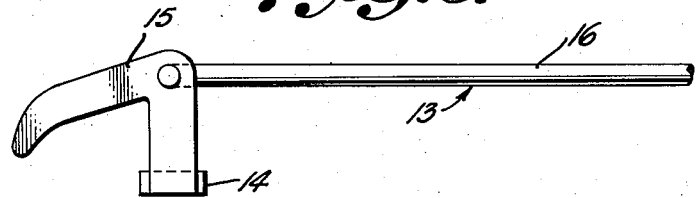
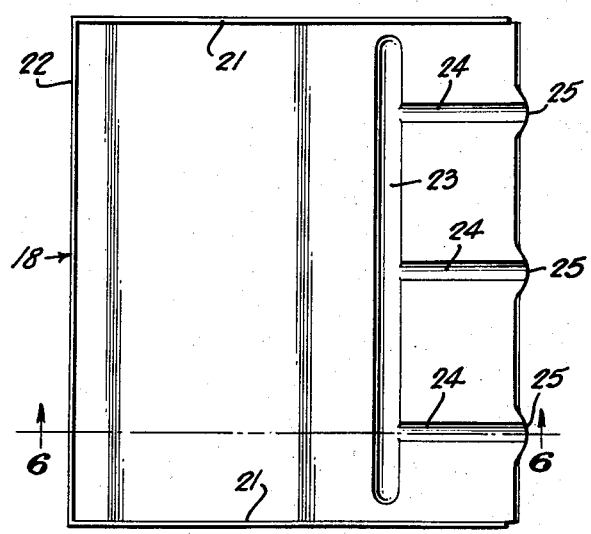
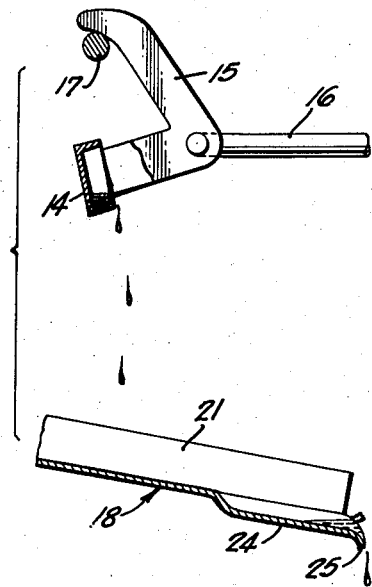
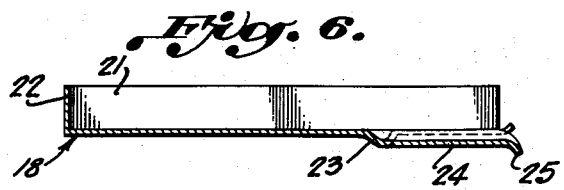

2,903,995

COATING APPARATUS FOR FRUITS AND VEGETABLES

John R. Fitzgerald, Harlingen, Tex.

Application August 10, 1955, Serial No. 527,561

1 Claim. (Cl. 118—18)

The present invention relates to improvements in apparatus for applying coatings such as wax or the like to fruits and vegetables.

It has long been the practice to treat fruits and vegetables for the market by applying a wax coating to the fruits and vegetables to replace any natural wax removed during the washing operation or to protect the fruits and vegetables from spoiling too quickly.

Numerous devices have been proposed for applying wax to edible products. One of the common types of waxers now being used provides a smooth surfaced roller or wheel revolving partly submerged in a tank of melted wax. Scrapers are provided to remove the wax from the surface of the roller and deposit it onto buffers or brushes which in turn deposit the wax onto the edible products. One of the main drawbacks to this form of apparatus is the fact that the apparatus is set to deliver a certain fixed quantity of wax and a ten degree change in temperature will cause a change in the viscosity of the wax and a different rate of application will result. Not only will the amount of wax vary with the temperature, whereby a different coating will adhere to the smooth surfaced roller, but the amount will vary with the level of wax in the reservoir into which the smooth surfaced roller revolves. The present invention provides an apparatus which is not affected by the change in level of the wax in the reservoir nor with the temperature of the wax over a wide range.

It has also been proposed to supply wax coatings by means of spray nozzles but this is objectionable because of the small orifices required and any change in viscosity due to change of temperature will cause clogging of the spray orifices.

Thus, the primary object of the present invention is to provide a novel coating apparatus for fruit and vegetables wherein the wax coating is evenly distributed and applied to the product being coated irrespective of variable conditions of temperature and viscosity of the coating material.

A further object of the invention is to provide a novel device for controlling the amount of wax to be deposited on treated objects, said device being of relatively simple construction and design and which can be applied to existing fruit and vegetable treating machines with minimum change in the machine.

A further advantage of the present invention resides in the fact that the wax is applied from above, and in such a manner that no dirt or residue is removed from the objects being treated and then reapplied in a mixture with the wax.

Other advantages and features of the present invention will be apparent from the following detailed description of a preferred embodiment of the invention taken in conjunction with the accompanying drawings wherein:

Figure 1 is a vertical sectional view through the upper portion of a fruit and vegetable treating machine with the subject matter of the present invention applied thereto.

Figure 2 is a top plan view of one of the dipper elements.

Figure 3 is a side view thereof.

Figure 4 is an enlarged detail view showing the tripping operation.

Figure 5 is a top plan view of one of the wax spreading trays.

Figure 6 is a sectional view on line 6—6 of Figure 5.

Referring to the drawings in detail, the wax applicator of the present invention is applied to any conventional type of article treating machine capable of receiving and conveying therethrough the articles to be treated. Such a machine generally comprises a plurality of rotary brushes mounted transversely in a frame with a motor mounted on the frame for revolving the brushes. These brushes are closely spaced and form a bed for the articles moving over the brushes. The objects to be treated pass through the machine by the revolving action of the brushes as well as from the urging of more incoming objects.

Positioned above the bed of brushes there is mounted a wax reservoir 10 containing the melted wax 11 and mounted above the reservoir transversely of the machine is a shaft 12. The shaft carries a plurality of wax dippers 13 spaced about two inches apart. In a conventional 48 inch width machine, there would be twenty-four dippers. Each dipper consists of a cup 14, carried by an angular tripping arm 15 pivotally connected to a rod 16 which is rigidly secured to the shaft 12 for movement therewith. The dipper shaft 12 is suitably powered to move back and forth in an arc of approximately 250 degrees, so that the cup will submerge into the melted wax 11, then lift out, pass over the edge of the reservoir and then contact a tripping rod 17 which turns the cup upside down and deposits the wax into wax spreading trays 18. The weight of the cup 14 with respect to the tripping arm 15 is such that the cup is maintained in a horizontal position until the tripping arm contacts the rod 17. As shown in Figure 1, any suitable means may be provided for oscillating the dipper shaft such as pulley 12a and belt 12b connected to suitable power means.

The trays 18 are approximately four inches wide and are mounted side by side on a cross member 19 secured to a casing member 20. Each tray has upstanding side walls 21 and rear wall 22 with the bottom wall extending beyond the side walls at the front end of the tray. The bottom wall of the tray is formed with a transverse groove 23 and three longitudinal grooves 24 merging with the transverse groove in order to spread the wax deposited into the tray into three outlet points instead of one outlet point. The grooves 24 terminate in dripping lips 25 to enable the wax to fall in drops.

Positioned above the bed of revolving brushes, not shown, on either side of the reservoir, are fast revolving cloth buffers 26 and 27, with buffers 26 positioned directly below the wax spreading trays 18. When the wax is deposited on the inclined trays, it falls onto the buffers 26 which transfer the wax onto the objects being treated which objects are passing between the buffers and the brushes as they advance through the machine.

The machine is provided with a hood 28 which carries any suitable heating elements such as electric light bulbs 29. The reservoir is heated by thermostatically controlled heaters 30 and any suitable pump means may be provided to supply the reservoir with wax.

In operation, the fruits or vegetables are fed to the machine and are advanced by the rotation of the revolving brushes positioned below the revolving buffers 26 and 27. As the buffers revolve, the melted wax in the reservoir 10 is deposited on the wax spreading trays 18 by the dippers 14 and falls onto the buffers 26 which in turn transfer the wax directly upon the fruit or vegetables passing underneath the buffers. The wax is thoroughly distributed over the surface of the revolving objects and the overhead buffers cooperate with the revolving brushes to thoroughly coat all sides as well as crevices of the objects with wax.

From the foregoing description, it is readily apparent that the present construction is well adapted to accomplish the objects and advantages of the invention. It will be understood that minor changes may be made in the details of construction without departing from the spirit of the invention except as may be required by the scope of the following claim.

Having thus described the invention, what is claimed is:

In an apparatus for applying a coating to fruits or vegetables having means for advancing said fruit or vegetables therethrough, an open top coating reservoir positioned above said means and spaced therefrom, buffers mounted adjacent said reservoir and above said means, a coating distributing tray mounted adjacent the reservoir and directly above the buffers, a rod pivotally supported at one of its ends above said reservoir, and being of a length to extend into the reservoir and when rotated to have its free end overlie the tray, means for oscillating said rod, a dipper pivotally secured to the free end of said rod for depositing coating material from the reservoir to the tray, a tripping arm mounted on and laterally extending from said dipper, and means above the tray for contacting the tripping arm for overturning the dipper, said tray being inclined whereby the coating material drips onto the buffers.

References Cited in the file of this patent
UNITED STATES PATENTS

| | | |
|---|---|---|
| 800,758 | Neville | Oct. 3, 1905 |
| 1,080,196 | Buerger | Dec. 2, 1913 |
| 1,741,722 | Kremmling | Dec. 31, 1929 |
| 2,402,986 | Cunning | July 2, 1946 |
| 2,464,529 | Recker | Mar. 15, 1949 |
| 2,535,573 | Hettinger | Dec. 26, 1950 |
| 2,578,427 | Hussey et al. | Dec. 11, 1951 |
| 2,595,151 | Lockwood | Apr. 29, 1952 |
| 2,700,953 | Howe et al. | Feb. 1, 1955 |